United States Patent
Sa Glaister et al.

(10) Patent No.: US 12,287,488 B2
(45) Date of Patent: Apr. 29, 2025

(54) INFLATABLE FACIAL INTERFACE

(71) Applicant: Meta Platforms Technologies, LLC, Menlo Park, CA (US)

(72) Inventors: Christopher Sa Glaister, Oakland, CA (US); Meng Peng, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/389,492

(22) Filed: Nov. 14, 2023

(65) Prior Publication Data

US 2024/0288697 A1    Aug. 29, 2024

Related U.S. Application Data

(60) Provisional application No. 63/448,854, filed on Feb. 28, 2023.

(51) Int. Cl.
*G02B 27/01* (2006.01)

(52) U.S. Cl.
CPC ............... *G02B 27/0176* (2013.01)

(58) Field of Classification Search
CPC .................................. G02B 27/0176
See application file for complete search history.

(56) References Cited

U.S. PATENT DOCUMENTS

| | | |
|---|---|---|
| 6,424,321 B1 | 7/2002 | Ronzani et al. |
| 8,371,293 B2 | 2/2013 | Henry et al. |
| 10,455,314 B1 | 10/2019 | Yang et al. |
| 2016/0178911 A1* | 6/2016 | Thurber ............ G02B 27/0176 359/630 |
| 2018/0210492 A1 | 7/2018 | Chen et al. |
| 2022/0066500 A1* | 3/2022 | Vankipuram ........... G06F 3/015 |
| 2022/0382062 A1 | 12/2022 | Cheng |

OTHER PUBLICATIONS

EPO—European Search Report for European Patent Application No. 24154902.1, dated Jun. 12, 2024, 5 pages.

* cited by examiner

*Primary Examiner* — Jonathan A Boyd
(74) *Attorney, Agent, or Firm* — McDermott Will & Emery LLP

(57) ABSTRACT

A headset device may include a facial interface having an inflatable bladder. The inflatable bladder may be configured to conform to facial contours of a face of a user when the headset device is worn. In examples, the inflatable bladder may include one or more bladder sections that may be filled with a fluid. In some examples, based in part on receiving an input, a pressure within one or more bladder sections may be adjusted from a first pressure to a second pressure in part by adjusting a volume of fluid within the one or more bladder sections of the inflatable bladder.

18 Claims, 5 Drawing Sheets

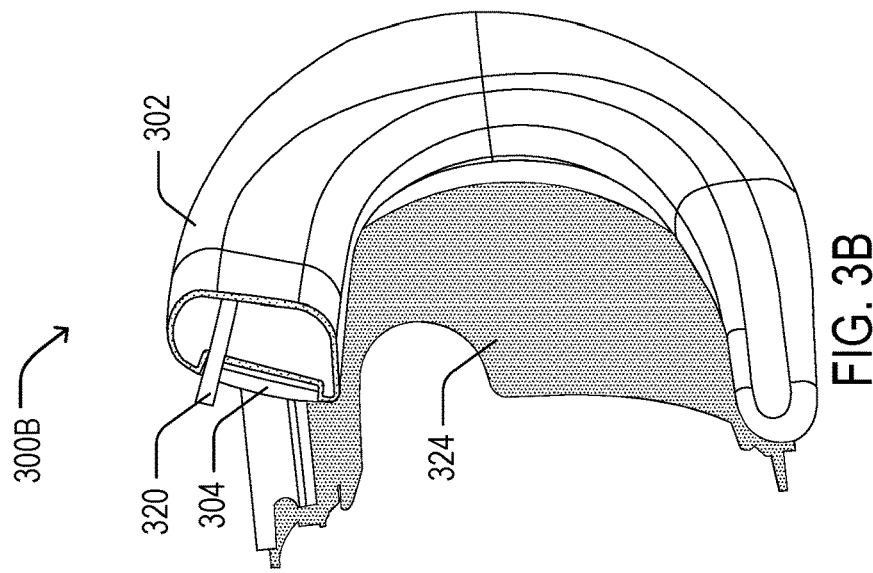
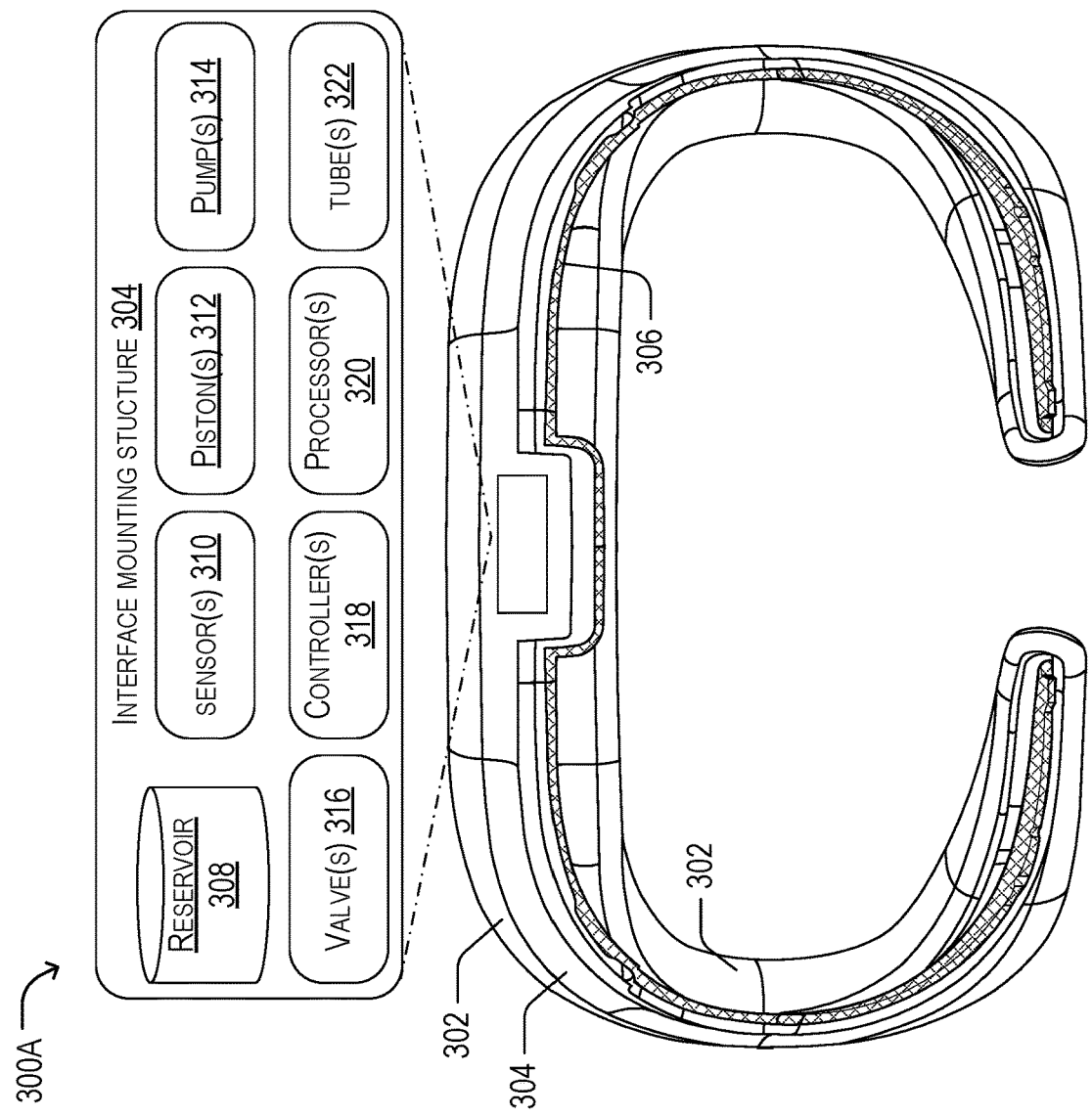
FIG. 3B
FIG. 3A

INFLATABLE FACIAL INTERFACE

RELATED APPLICATIONS

This application claims the benefit of, and priority to, U.S. Provisional Application No. 63/448,854 filed on Feb. 28, 2023, which is incorporated herein by reference.

BACKGROUND

Extended reality (e.g., virtual reality, augmented reality, mixed reality, etc.) devices have grown in popularity and technological advancements have facilitated their use in a variety of applications. However, conventional extended reality devices contain facial interfaces (the portion of the device that contacts the user's face) that are formed from material that is limited in its ability to evenly distribute pressure across a range of face shapes and sizes. As such, raised points on a user's face will experience higher localized pressure, which often results in discomfort and prevents users from fully and comfortably utilizing the full potential provided by extended reality devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A illustrates a posterior view of an example inflatable bladder usable with an inflatable facial interface in accordance with an example of the present disclosure.

FIG. 3B is a side cross-sectional view of an example inflatable bladder usable with an inflatable facial interface in accordance with an example of the present disclosure.

DETAILED DESCRIPTION

Figure 1:
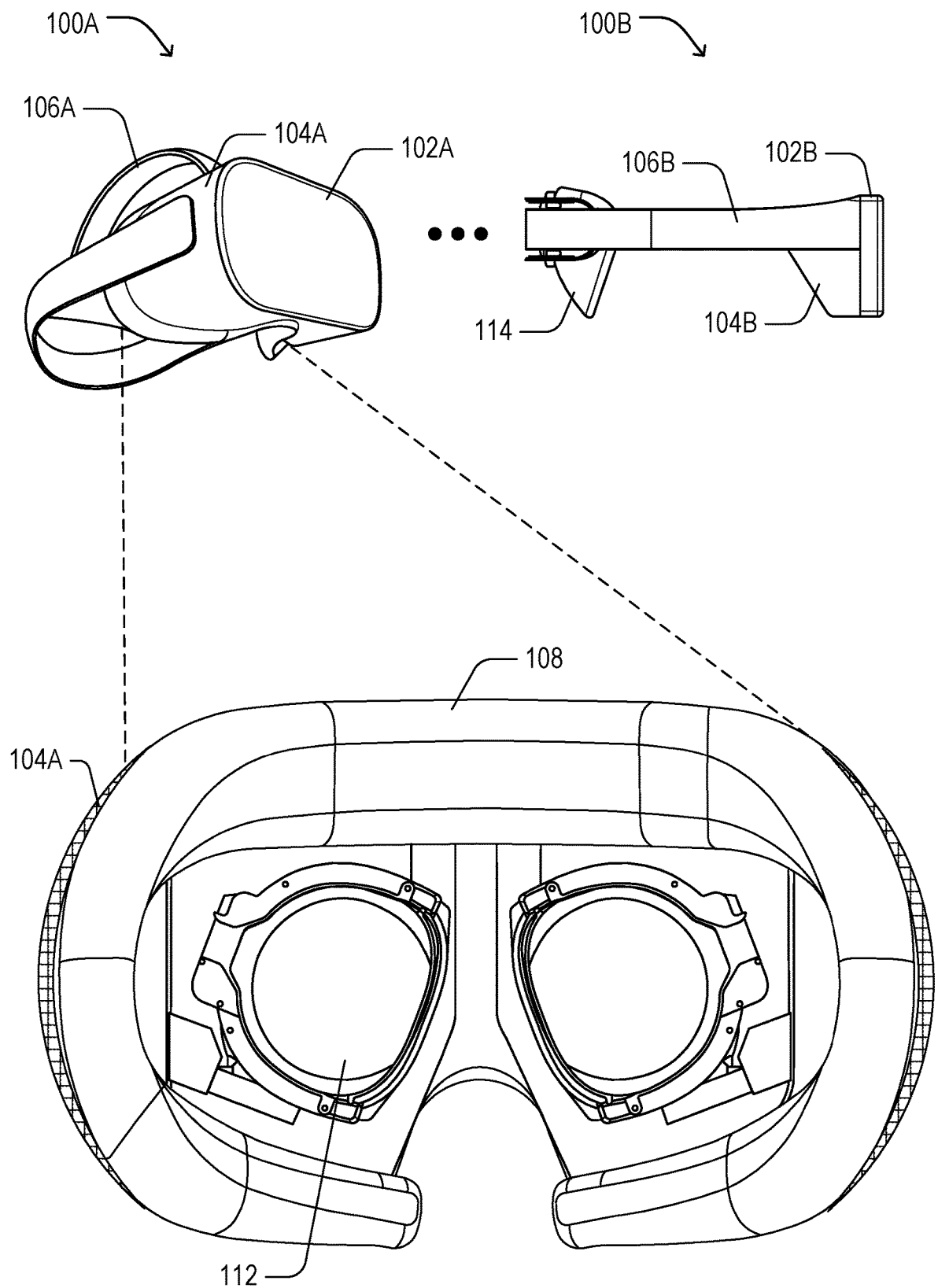
FIG. 1 illustrates an example headset device having an inflatable facial interface in accordance with an example of the present disclosure.

As discussed above, existing facial interface designs do not provide adequate comfort for users of various head shapes and sizes, especially during prolonged use. It is challenging to build a facial interface which stays comfortable for extended periods of time for the population target range of 5% th to 95% th percentile. One main source of discomfort caused by existing facial interface designs are localized pressure points on a user's face. The way that conventional user interfaces distribute pressure across a user's face is dependent on the shape of the facial interface's rigid frame as well as the properties of the material in contact with a face of the user.

Existing facial interfaces are formed by applying a band of compliant foam on a surface of the frame of an extended reality device. However, foam is limited in its ability to evenly distribute pressure across various head shapes and sizes. Furthermore, the reaction force imparted on a user's face is related to the amount of deformation. This ultimately causes raised points on the user's face to experience high localized pressure points. Using a softer and more compliant foam risks the foam becoming stiff or rigid due to being compressed to a base of the facial interface's rigid frame (i.e., the portion of the rigid frame the foam is bonded to) and exacerbating the pressure points. Furthermore, increasing the thickness of the foam spaces the display of the extended reality device further from a user's eyes and decreases the stability of the extended reality device.

This application describes a facial interface having an inflatable bladder for an extended reality device (e.g., a headset device, head-mounted device, headband, hat, helmet, goggles, glasses, or other wearable device). In some examples, the inflatable bladder may be coupled to the housing of the extended reality device and configured to conform to the facial contours of a face of a user when the extended reality device is worn by the user. In examples, an inflator may be in flow communication with the inflatable bladder and configured to, upon activation (e.g., automatically or based on a user input), adjust a pressure within the inflatable bladder (e.g., from a first pressure to a second pressure). In examples, the inflatable bladder may be filled with a fluid, such as a gel, water, air, nitrogen, argon, or any of the fluids discussed throughout this application, to a baseline volume or pressure during manufacturing.

In examples, the inflatable bladder may comprise of any number of bladder sections that are configured to abut the facial contours of the face of the user. Controlling a pressure level within individual inflatable bladder sections can provide a more customized and comfortable facial interface. In some examples, the inflatable bladder comprises a first inflatable bladder section configured to abut a forehead of the user, a second inflatable bladder section configured to abut a right temple and right cheek of the user, and a third inflatable bladder section configured to abut a left temple and left cheek of the user. In examples, the inflator may be in flow communication with the first inflatable bladder section, the second inflatable bladder section, and the third inflatable bladder section. In examples, the inflatable bladder sections may be partitioned so that individual inflatable bladder sections may be inflated to a different pressure or filled with a different volume of fluid. In some examples, the inflatable bladder may comprise of five bladder sections. For example, the inflatable bladder may include a first inflatable bladder section configured to abut a forehead of the user, a second inflatable bladder section configured to abut a right temple of the user, a third inflatable bladder section configured to abut a right cheek of the user, a fourth inflatable bladder section configured to abut a left temple of the user, and a fifth inflatable bladder section configured to abut a left cheek of the user, wherein the inflator is in flow communication with the first inflatable bladder section, the second inflatable bladder section, the third inflatable bladder section, the fourth inflatable bladder section, and the fifth inflatable bladder section.

In some examples, the inflatable bladder may be at least partially covered by a layer of foam or fabric. In some examples, the layer of foam or fabric may be removably coupled to the inflatable bladder so that it can be replaced or washed. In some examples, a first side of the inflatable bladder is partially covered by a layer of foam or fabric and configured to conform to the facial contours of the face of the user and a second side opposite the first side extends at least partially around a portion of the housing associated with the extended reality device.

In some examples, the extended reality device may include an inflation/deflation system configured to increase or decrease a pressure within one or more sections of the inflatable bladder. In some examples, the inflation/deflation system may include one or more of a reservoir filled with a fluid (e.g., such as any of those described throughout the application), sensor(s), valve(s), piston(s), pump(s), compressor(s), controller(s), processor(s), power source(s), memory, cable(s), wire(s), tube(s), port(s), combinations of any of these, or any other component associated with adjusting a pressure within the inflatable bladder as described throughout the application. In some examples, the extended reality device may include a pressure sensor coupled to the inflatable bladder to measure a pressure within the inflatable bladder, a reservoir adapted to hold fluid, and a valve coupled to the reservoir and the inflatable bladder. The valve may be configured to, upon activation, release fluid from the reservoir and into the inflatable bladder in order to adjust the pressure within the inflatable bladder.

In some examples, the extended reality device may include multiple inflatable bladders. For example, a first inflatable bladder may be positioned on a first side of the extended reality device and configured to conform to a face of the user and a second inflatable bladder may be positioned on a second side of the extended reality device opposite the first side and configured to conform to a back of the head of the user.

In some examples, an inflation/deflation system associated with the extended reality device may receive input to adjust a pressure within the inflatable bladder. In examples, based at least in part on receiving the input, the inflation/deflation system may activate an inflator to increase or decrease the pressure and/or volume of fluid within the inflatable bladder. In some examples, receiving the input to adjust the pressure within the inflatable bladder is based in part on determining that a length of a strap associated with the housing of the extended reality device has been adjusted from a first length to a second length (i.e., from a first tightness to a second tightness). In some examples, receiving the input to adjust the pressure within the inflatable bladder is based in part on a type of environment or action associated with an extended reality experience displayed via the head-mounted device (e.g., diving under water, falling, running, riding a roller coaster, simulating touch or an object hitting a user's face, etc.).

In some examples, the inflation/deflation system may adjust a pressure within the inflatable bladder based at least in part on how long a user has worn the extended reality headset. In some examples, the inflation/deflation system may periodically change or cycle the pressure level within the inflatable bladder during use of the extended reality device in order to temporarily relieve pressure and/or to promote blood flow.

These and other aspects are described further below with reference to the accompanying drawings. The drawings are merely example implementations and should not be construed to limit the scope of the claims. For example, while examples are illustrated in the context of a head-mounted electronic device, the techniques may be used in association with any electronic device.

Example Headset Device

FIG. 1 illustrates an example headset 100A having a facial interface including an inflatable bladder 108. The headset 100A may be an extended reality device that enables a user to view, create, consume, and share media content. In some examples, the headset 100A may include a display structure 102A (including a lens structure 112), an external frame 104A coupled to the display structure 102A, and/or a strap assembly 106A. In some examples the headset 100A may include a facial interface having an inflatable bladder 108 coupled (directly or indirectly) to the external frame 104A. In some examples, the inflatable bladder 108 may be coupled to an interface mounting structure (shown in FIG. 2) that is coupled to the external frame 104A.

Display structure 102A may include one or more display devices (e.g., electronic display screen(s), projector(s), lens(es), head-up display(s), etc.) capable of providing an extended reality presentation of a virtual environment. The term "virtual environment" or "extended reality environment" refers to an at least partially computer-generated environment in which users can fully or partially immerse themselves. For example, an extended reality environment can include virtual reality, augmented reality, mixed reality, etc. Display structure 102A may be located at a front end of the headset 100A and may extend to cover at least a portion of the eyes of a user. In some examples, the display structure 102A may include a content delivery system which can present media on a presentation surface. The content delivery system can include a near eye display (NED) to be worn on the face of the user such that visual content is presented to the user. Content presented to the user may include, for example, one or more images, video, or a combination thereof. The display structure 102A can include or otherwise be associated with lens structure 112. The lens structure 112 may be located within an aperture of the display structure 102A and/or the external frame 104A of the headset 100A.

In some examples, display structure 102A may be releasably coupled to the external frame 104A (e.g., via a tongue and groove junction). In some examples, the external frame 104A may be substantially rigid and define a general shape of the headset 100A. External frame 104A may be configured to stabilize the display structure 102A relative to a user's head. In some examples, the external frame 104A may house one or more components (e.g., pumps, reservoirs, compressors, pistons, etc.) associated with adjusting a pressure within the inflatable bladder 108.

External frame 104A may be coupled to a strap assembly 106A. Strap assembly 106A may be used for adjustably mounting or positioning the headset 100A on a user's head. The strap assembly 106A may include one or more straps coupled to any part of the headset 100A and configured to adjustably conform to the top, and/or sides of the head of a user when the user is wearing the headset 100A. In some examples, one or more flexible straps of the strap assembly 106A may be located at least partially inside the external frame 104A of the headset 100A. The strap assembly 106A may be formed from one or more elastomeric materials, including relatively hard elastomeric materials such as polyamide, polypropylene, polyurethane and/or polyethylene, etc. and/or relatively soft materials such as a natural material (rubber, silk, cork, wool, felt, etc.), a synthetic material (styrene-butadiene block copolymers, polyisoprene, ethylene propylene rubber, ethylene propylene diene rubber, silicone elastomers, fluoroelastomers, polyurethane elastomers, and nitrile rubbers, neoprene, polyester, etc.), or any combination thereof. In some examples, strap assembly 106A may be coupled to an interface mounting structure associated with headset 100A. Applying tension to the strap assembly 106A via one or more tensioning mechanisms or adjustment mechanisms (not shown) can cause the external frame 104A to translate toward and/or be pressed against the head and face of a user.

The headset 100A may include a facial interface having an inflatable bladder 108. The inflatable bladder 108 may be configured to contact at least a portion of a face of a user, such as a forehead, temples, cheeks, and/or nose. In some examples, inflatable bladder 108 may be formed from a pliable material and/or elastomeric material (i.e., material that allows the inflatable bladder 108 to expand and contract) such as a thermoplastic polyurethane (TPU) (e.g., using blow molding techniques), silicone (e.g., using liquid silicone injection molding techniques), rubber or rubberlike compounds, natural rubber, latex nitrile, flexible polymer, thermoplastic elastomer (TPE), thermoplastic co-polyesters (TPC), or polyether block amide (PEBA). In some examples, inflatable bladder 108 may be formed from a flexible yet inextensible material (in whole or in part). For example, the inflatable bladder 108 may be formed from a composite of flexible polymer film configured to seal the inflatable bladder and an inextensible woven structure to physically limit the degree to which the bladder can expand (i.e., limit an expansion of the inflatable bladder). In some examples, the woven structure may be in a membrane. In some examples, the woven structure may include inextensible strands which span across an internal portion of the inflatable bladder. The woven structure may control the maximum size and/or shape of the inflatable bladder as well as how firm the bladder feels when the bladder reaches a maximum volume. For example, when the inflatable bladder is inflated to a point where the inextensible strands are taught (i.e., the inflatable bladder is inflated to maximum volume), a pressure level within the inflatable bladder may continue to increase a firmness of the inflatable bladder while maintaining the shape of the inflatable bladder.

In some examples, inflatable bladder 108 may be formed from a material having a durometer rating (shore hardness) between about 80A to about 90A. For example, the inflatable bladder may be formed from a material having a durometer rating of about 85A hardness TPU. Inflatable bladder 108 may be manufactured from a material including a range of thicknesses (e.g., from about 0.2 mm to about 3 mm). In some examples, the inflatable bladder may be manufactured from a non-stretchable (or inextensible) material including a range of thicknesses from about 0.2 mm to about 1 mm (e.g., 0.3 mm, 0.5 mm, or 0.7 mm). In some examples, the inflatable bladder may be manufactured from a stretchable (or expandable) material having a durometer rating of about 30A hardness and having a thickness of about 0.6 mm (e.g., a silicone material). The inflatable bladder 108 may have a uniform or non-uniform wall thickness throughout. In some examples, the inflatable bladder 108 (or portions thereof), may include a layer of comfort material (e.g., foam, fabric, etc.) which is compressible and/or breathable.

In some examples, the inflatable bladder 108 may have a non-planar shape and/or extend in variety of directions in order to better conform to a forehead, temples, cheeks, and/or nose of the user. For example, a first portion of the inflatable bladder 108 configured to contact a forehead of the user may have a curved profile in order to better conform to the forehead. In some examples, the inflatable bladder 108 may have sides that taper to a smaller inner diameter. For example, the inner diameter of a middle portion (e.g., a portion intended to contact a forehead of the user) of the inflatable bladder 108 may progressively or gradually decrease along the lateral sides of the inflatable bladder 108 (e.g., portions that are intended to contact the temples and/or cheeks of the user). In some examples, the inner diameter of the inflatable bladder 108 may range between about 2 mm to about 25 mm when inflated. In some examples, the inflatable bladder 108 may include internal structures and/or internal fused joints (not shown) to control the shape of the inflatable bladder 202 when the internal pressure or volume of fluid in the inflatable bladder is adjusted.

The inflatable bladder 108 may be filled with a gas (e.g., air, nitrogen, argon, etc.), water, saline, oil, or a gel (e.g., synthetic hydrogels, natural hydrogels including protein-based hydrogels, hydrogels based on polyesters obtained from low-molecular-weight biomolecules, etc.) or any other fluid discussed throughout this application. An inflatable bladder 108 may be formed from an impermeable, semi-permeable, or permeable material, such that flow of air and/or fluid through the inflatable bladder 108 may be at least partially inhibited. In some examples, the inflatable bladder may be filled with compressible beads made from a polystyrene, rubber, elastomers, gel, and the like. Compressible beads may provide a cushioning effect while being able to move within the bladder freely and redistribute pressure. The material forming the bladder would act to constrain the compressible beads within the bladder while enabling air to move in and out of the bladder as needed. In some examples, a first portion or bladder section of the inflatable bladder may be filled with a fluid (e.g., air) while a second portion or bladder section of the inflatable bladder may be filled with compressible beads.

In some examples, the inflatable bladder 108 may be pressurized to above atmospheric pressure or to about atmospheric pressure (i.e., zero-gauge pressure). In some examples, the inflatable bladder may be filled to a maximum pressure of about 2 psi. Inflatable bladder 108 may be inflated to a baseline or predetermined pressure during the manufacturing process and sealed so that no leak path is provided around the inflatable bladder perimeter. In some examples, due to variations in atmospheric pressure, the inflatable bladder 108 may include a low flow rate valve that is configured to equalize the pressure within the inflatable balder over a period of time (e.g., 24 hours, 48 hours, etc.). This ensures that the cushioning effect of the inflatable bladder is consistent in a variety of locations after the extended reality device is shipped.

The inflatable bladder 108 may be configured to have a single fluid filled section or chamber or multiple separate or connected bladder sections or chambers. In some examples, the inflatable bladder 108 may comprise any number of distinct bladder sections, chambers, and/or cells (see, e.g., discussion of FIG. 4). In some examples, the inflatable bladder sections may be substantially separate from one another so that individual sections may be inflated to different pressures. This allows for a more customized fit and greater user comfort. In other examples, multiple bladder sections may be connected by one or more fluid passages such that they are maintained as substantially the same pressure. In some examples the inflatable bladder 108 may be partitioned into two or more bladder sections that run along the length of the inflatable bladder and are configured to be substantially parallel to one another.

In some examples, an example headset 100B may include a display structure 102B (including a lens structure), an external frame 104B coupled to the display structure 102B, a strap assembly 106B, and/or a rear head-engaging structure 114 that includes one or more additional inflatable bladders filled with a fluid, such as any of the fluids discussed above, and configured to conform to the back of a user's head. The one or more additional bladders in the rear head-engaging structure 114, when present, may be the same or different than those disposed in the front section of the headset 100B and may be configured according to any of the examples given throughout this application of bladders in the front section of the headset.

Figure 2:
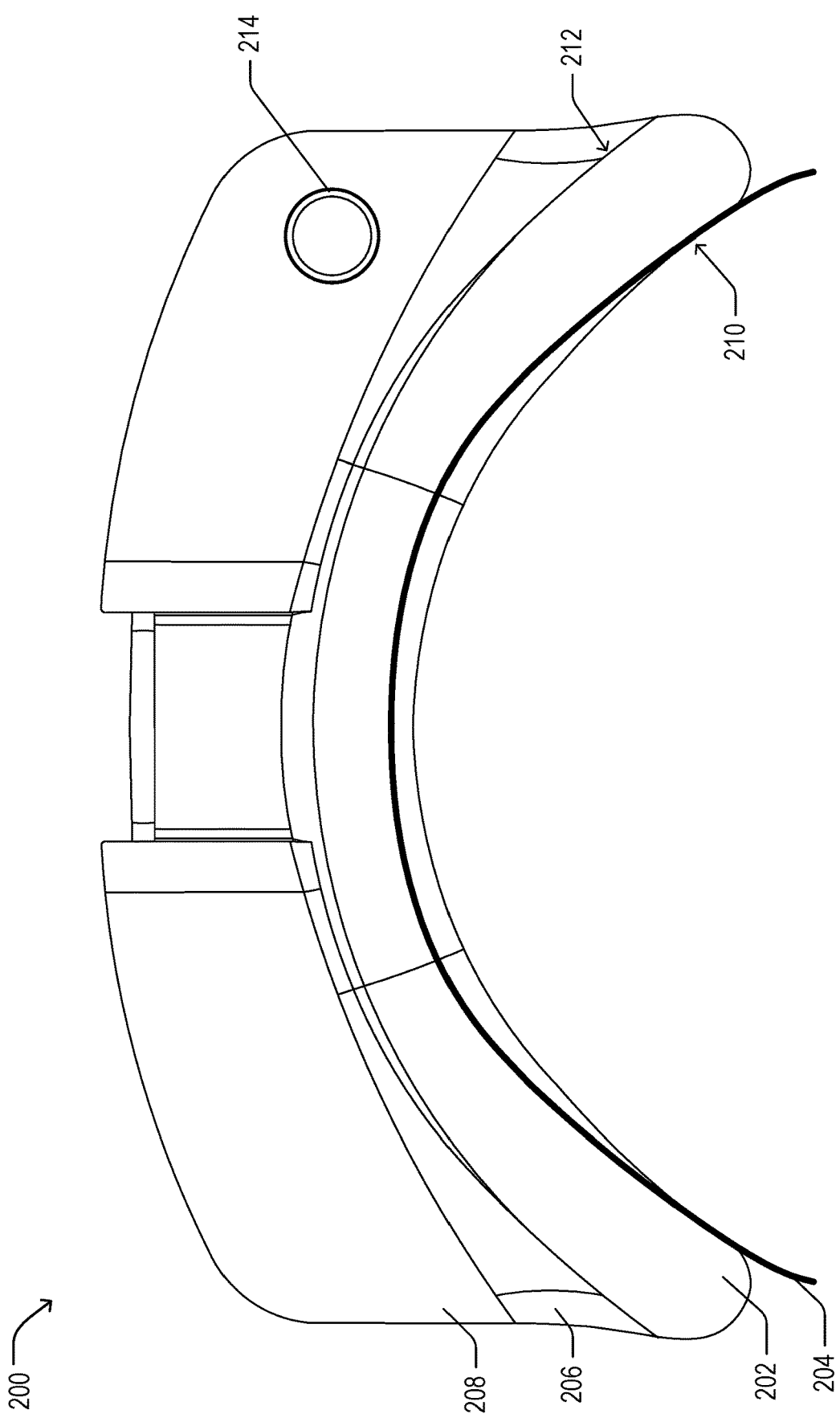
FIG. 2 illustrates a top view of an example inflatable bladder coupled to a headset device in accordance with an example of the present disclosure.

FIG. 2 illustrates a top view of an example headset 200 including a facial interface having an inflatable bladder 202. In some examples, the inflatable bladder 202 may be coupled at least in part to an external frame 208 of the headset 200 device. In some examples, the inflatable bladder 202 may be coupled to an interface mounting structure 206 that is coupled to the external frame 208.

The inflatable bladder 202 may include a facial side 210 that contacts a face of a user and a mounting structure side 212 opposite the facial side 210 that is configured to contact the interface mounting structure 206. The inflatable bladder 202 in this example may be configured to contact a forehead (see, e.g., forehead profile 204), temples, cheeks, and/or nose of a user. During manufacturing, the inflatable bladder 202 may be filled with a gas or other fluid or gel, such as any of those described throughout the application, to a predetermined or baseline pressure and/or volume and sealed so that no leak path is provided around a perimeter of the inflatable bladder 202. In some examples, inflatable bladder 202 may be covered (in whole or in part) in a layer of foam, comfort material, and/or fabric, etc. in some examples, the layer of foam, comfort material, and/or fabric may be removably coupled to the inflatable bladder 202 (e.g., to enable a user to replace it or wash the material).

Inflatable bladder 108 may be coupled to an interface mounting structure 206 in any suitable manner (e.g., via an adhesive, snap fit, mechanical fasteners, etc.). A portion of the inflatable bladder 202 may be positioned so that it overlaps and/or extends over a portion of the interface mounting structure 206. In some examples, the inflatable bladder 202 may be removably coupled to interface mounting structure 206 (e.g., via tongue and groove).

The interface mounting structure 206 may be coupled to an external frame 208 of headset 200 in any suitable manner (e.g., via an adhesive, snap fit, mechanical fasteners, clips, etc.). Interface mounting structure 206 may be formed from one or more substantially rigid or semi-rigid polymers (e.g., polycarbonate, acrylonitrile-butadiene-styrene (ABS), polycarbonate/acrylonitrile-butadiene-styrene terpolymer blend (PC/ABS), polycarbonate-ABS, acrylic, nylon, polyvinyl chloride (PVC), high-density polyethylene (HDPE), etc.). In other examples, the interface mounting structure 206 may be made of a flexible and/or stretchable elastomeric material that is able to bend and flex with the inflatable bladder 202. In some examples, the interface mounting structure 206 may be made of a material having a higher modulus of elasticity than a material from which the inflatable bladder 202 is made. The interface mounting structure 206 may house one or more components associated with adjusting a pressure within the inflatable bladder 202. For example, interface mounting structure 206 may include an inflation/deflation system that includes one or more of a reservoir (e.g., a rigid or collapsible reservoir) filled with a fluid (e.g., such as any of those described throughout the application), sensor(s) (e.g., pressure sensor, fluid volume sensor, temperature sensor), valve(s) (e.g., a bidirectional valve, double action valve), piston(s), pump(s), compressor(s), controller(s), processor(s), power source(s), memory, cable(s), wire(s), tube(s), port(s), combinations of any of these, or any other component associated with adjusting a pressure within the inflatable bladder 202.

In some examples, interface mounting structure 206 may be coupled to external frame 208. In some examples, external frame 208 may house (in whole or in part) one or more components associated with adjusting a pressure and/or volume of fluid within inflatable bladder 202. The external frame 208 may be associated with a first strap adjustment portion and a second strap adjustment portion. The first strap adjustment portion and the second strap adjustment portion may be associated with strap assembly 106A strap assembly 106B as described in relation to FIG. 1. As shown in FIG. 2, adjusting one or more straps associated with headset 200 may exert pressure on a forehead of a user (see, e.g., forehead profile 204) to adjust a force with which the headset 200 is secured to the head and face of the user.

In some examples, the external frame 208 may include a pump 214 configured to hold a volume of fluid (e.g., air). In examples, the pump 214 may have a cylindrical shape and extend past a surface of the external frame 208 (e.g., extend upward from a top surface of the external frame). Though the pump 214 is in FIG. 2 is shown to have a circular shape, the pump may be any shape and/or size. In some examples, the pump 214 may be fluidly connected to the inflatable bladder 202 (e.g., via a tube) and configured to adjust a pressure within the inflatable bladder 202. In examples, the pump 214 may be disposed on a medial side of the extended reality headset, on a top surface of the extended reality headset, or on a bottom surface opposite the top surface. In some examples, the external frame 208 may include multiple pumps (not shown) configured to inflate and/or deflate one or more bladder sections. For example, a first pump may be configured to inflate one or more sections of the inflatable bladder 202 and a second pump may be configured to deflate a different section(s) of the inflatable bladder 202.

FIG. 3A is a posterior view 300A (i.e., a view of the side that attaches to a housing or external frame of the headset) of an example inflatable bladder 302 coupled to an interface mounting structure 304. The interface mounting structure 304 may be coupled to an external frame (not shown in this figure) such as that shown in FIG. 2 of a headset. In some examples, interface mounting structure 304 may be partially hollow. For example, interface mounting structure 304 may include an internal chamber 306 configured to accommodate one or more components, such as any of the components described in relation to FIG. 2 or elsewhere in the application, associated with changing and/or maintaining a pressure within the inflatable bladder 302.

As mentioned above, interface mounting structure 304 may house one or more components associated with changing and/or maintaining a pressure within inflatable bladder 302 (e.g., an inflation/deflation system). In the example illustrated in FIGS. 3A and 3B, the interface mounting structure 304 includes a reservoir 308 (which may be rigid or flexible enclosure), one or more sensor(s) 310 (e.g., pressure sensor, temperature sensor, flow sensor, force sensor, etc.), piston(s) 312, pump(s) 314, valve(s) 316 (e.g., bidirectional valve, double action valve, check valve, pressure relief valve, etc.) controller(s) 318, processor(s) 320, actuator(s), tube(s) 322, and/or a power source (e.g., internal battery, external battery, a fuel cell, a photovoltaic cell, etc.). The various components may be rearranged, combined, and/or omitted depending on the requirements for a particular application or function. Alternative or additional components may be used in other examples.

In some examples, an inflation/deflation system may be housed (in whole or in part) within the interface mounting structure 304. In some examples, one or more components (or portions of the components) of the inflation system may be housed in an external frame (e.g., external frame 208) of a headset. The inflation/deflation system may be configured to increase and/or decrease an internal pressure of inflatable bladder 302 at least in part by controlling the volume of fluid within the inflatable bladder 302. In some examples, the inflation/deflation system may include a reservoir holding fluid, a passageway extending from the reservoir (e.g., tube 322), and at least one valve coupled to an internal portion of inflatable bladder 302. The valve 316 may be a bidirectional valve and may enable fluid to flow in and out of the reservoir and into the inflatable bladder 302. In some examples, a double action valve may be coupled to the reservoir and the inflatable bladder 302 and configured to, upon activation, release the fluid from the reservoir and into the inflatable bladder. In some examples, the inflation/deflation system may include an inflator in flow communication with the inflatable bladder. The inflator may be configured to, upon activation, adjust a pressure within the inflatable bladder from a first pressure to a second pressure in part by increasing or decreasing the volume of fluid within the inflatable bladder.

In some examples, the reservoir may be a collapsible reservoir and may release fluid when a user manually squeezes or pushes on the collapsible reservoir or on a pump associated with the collapsible reservoir. As the collapsible reservoir collapses due to an externally applied force, fluid is forced out of the collapsible reservoir, flows through a passageway (e.g., through a fluid line or flexible tubing) and valve 316 and into the inflatable bladder 302 causing pressure to increase within the inflatable bladder 302. In some examples, to decrease the volume of fluid within the inflatable bladder 302, a valve 316 (e.g., a release valve) may be activated. In some examples, interface mounting structure 304 may include a reservoir 308 holding a volume of fluid that is smaller than the maximum volume in the inflatable bladder 302. The reservoir 308 may be configured to hold enough fluid to effectively change the internal pressure and/or volume of fluid in the inflatable bladder 302. In some examples, the reservoir 308 may have a cylindrical, rectangular, square, or pouch shape. In some examples, reservoir 308 may be formed to fit within a dimension of interface mounting structure 304. Reservoir 308 may be configured to hold a percentage of a maximum volume of fluid that can be contained within the inflatable bladder 302. For example, reservoir 308 may be configured to hold anywhere from 10%-35% of the maximum volume of fluid that can be contained within inflatable bladder 302.

In some examples, the reservoir 308 may include a piston 312 configured to displace fluid stored in the reservoir 308 (i.e., increase or decrease the interior volume of fluid in the reservoir 308). In some examples, the piston 312 may have a piston head located within the reservoir and a piston shaft that extends from a peripheral edge of the piston head to a location outside of the reservoir 308. One or more seals may be included around an outer peripheral surface of the piston head for sealing against the interior surface of the reservoir 308. The piston 312 may be bi-directional and configured to be moveable in an axial direction of the reservoir 308. In some examples, the piston 312 may be positioned within the reservoir 308 so that when the piston 312 is activated (e.g., via controller 318), the fluid within the reservoir 308 varies with the movement of the piston 312 in the axial direction of the reservoir 308. In some examples, the piston 312 may be associated with an anti-rotation structure in order to inhibit the piston 312 from rotating about the axis. In some examples, one or more position sensors may be communicatively coupled to the piston 312 and configured to detect a position of the piston 312 relative to the reservoir 308.

In some examples, the inflation/deflation system may include one or more sensor(s) 310. For example, the inflation/deflation system may include a pressure sensor, temperature sensor, flow sensor, force sensor, or any other sensors discussed throughout the application. In some examples, a pressure sensor may be an absolute pressure sensor, a gauge pressure sensor, or a differential pressure sensor. In some examples, a pressure sensor may be disposed on any portion of the extended reality device. For example, the pressure sensor may be coupled to an internal portion of the inflatable bladder, proximate a valve associated with the inflatable bladder, coupled to a tube associated with a pump, a reservoir, or any other component associated with the inflation/deflation system.

In some examples, a pump 314 may be fluidly connected to the inflatable bladder (e.g., via a tube). In examples, the pump 314 may be disposed on a side of the extended reality headset (e.g., proximate the inflatable bladder), on a top surface of the extended reality headset, or on a bottom surface opposite the top surface. In some examples, the pump may be coupled to the inflatable bladder via a tube 322. In some examples, the pump 314 may be coupled to individual bladder sections via individual tubes so that each bladder section may be inflated/deflated individually. In some examples, the pump 314 may include a valve 316 associated with a tube 322 and configured to be set in a closed position when the pump 214 is inactive (i.e., to prevent fluid communication between the pump 314 and the inflatable bladder 302). In some examples, when a user activates the pump 314 (e.g., applying force by pushing or pressing on the pump 314), the valve 316 may switch from a closed position to an open position and enable fluid to enter or exit the inflatable bladder 302. In some examples, the inflatable bladder 302 may be associated with a release valve configured to release fluid and decrease a pressure level when activated. Controller 318 may control the internal pressure within the inflatable bladder in part by controlling a volume of fluid within the inflatable bladder. The controller 318 may be configured to set a minimum pressure and maximum pressure within the inflatable bladder 302. In some examples, the inflation/deflation system includes a pressure sensor that measures pressure within the inflatable bladder 302 and adjusts the pressure (or volume of fluid) to keep the pressure within a desired comfort pressure range. In some examples, the inflation/deflation system may determine that a length of a strap associated with the headset device has been adjusted from a first length to a second length (or from a first tightness to a second tightness) and adjusts the pressure within one or more sections of the inflatable bladder accordingly. For example, if a user increases a tightness of a strap (e.g., by adjusting the length of strap assembly 106A), the pressure in one or more sections of the inflatable bladder 302 may decrease to reduce the amount of force applied to the face (or portions of the face, such as the forehead, cheeks, temples, nose, etc.) of a user. In some examples, if a user decreases the tightness of a strap associated with the headset, the pressure in the one or more sections of the inflatable bladder 302 may increase in order to adjust the amount of force applied to the face (or portions of the face, such as the forehead, cheeks, temples, nose, etc.) of the user.

In some examples, a pressure within the inflatable bladder may be adjusted using a dial. For example, a dial may be associated with a controller 318 and include a number of pressure settings (e.g., low, medium, high, 1-5, etc.). A user may adjust a pressure or volume of fluid within the inflatable bladder by adjusting the dial from a first dial setting to a second dial setting. The dial may be associated with control circuitry that transmits an activation signal to a pump or inflator coupled to the inflatable balder and causes the pump or inflator to adjust a pressure or volume of fluid within the inflatable bladder.

In some examples, the controller 318 may be configured to periodically change or cycle the pressure level within the inflatable bladder during use of the headset in order to temporarily relieve pressure and/or to promote blood flow. In some examples, the controller 318 may automatically change or cycle a volume of fluid within the inflatable bladder based on a period of time the headset is worn (e.g., every 5 min, 15 min, 30 min, 1 hour, etc.). In some examples, the controller 318 may change or cycle a level of pressure within one or more sections of the inflatable bladder 302. For example, the controller 318 may increase the pressure within one bladder section while decreasing the pressure within a second bladder section. In some examples, the controller 318 may progressively change or cycle the pressure level within one or more sections of the inflatable bladder 302 based on how long a user has worn the headset. For example, the controller may change the pressure within one or more sections of the inflatable bladder 30 min after the user first puts on the headset, after which the controller may change the pressure within one or more sections of the inflatable bladder every 15 minutes (i.e., 45 min after putting on the headset, then 1 hour, etc.).

In some examples, the controller 318 may be used to set and recall a pressure setting (or preference setting) associated with the inflatable bladder. For example, two or more users may use the same headset device, but may have different head shapes and/or sizes. As such, a first user may prefer a first pressure level associated with one or more sections of the inflatable bladder while a second user may prefer a second pressure level associated with one or more sections of the inflatable bladder. In examples, the controller 318 may enable a user to set and recall a pressure setting (or preference setting) associated with the inflatable bladder. In some examples, the controller 318 may enable two or more users to set and recall individual pressure settings by pressing or otherwise activating an activation mechanism (e.g., a physical switch, adjustment lever, button, control, etc.) associated with the inflation/deflation system.

In some examples, the inflation/deflation system may be configured to provide haptic feedback to enhance a user's extended reality experience. For example, pressure within the inflatable bladder may increase or decrease based on the environment displayed by the extended reality experience. For example, pressure within one or more sections of the inflatable bladder may gently increase and/or decrease to simulate a virtual experience such as diving under water, riding a roller coaster, falling, touch, etc. In some examples, inflatable bladder may include one or more vent(s), nozzle(s), and/or perforation(s) that enable the inflation/deflation system to emit air from the inflatable bladder onto a user's face to simulate an environment, such as a breeze. For instance, a vent associated with the inflatable bladder may be configured to receive a signal from the extended reality device to emit or release air from the bladder in order to simulate a breeze.

In some examples, the processor(s) 320 may include hardware for executing instructions, such as those making up a computer program or application. For example, to execute instructions, the processor(s) 320 may retrieve the instructions from an internal register, an internal cache, memory, or other computer-readable media, and decode and execute them. By way of example and not limitation, the processor(s) 320 may comprise one or more central processing units (CPUs), graphics processing units (GPUs), holographic processing units, microprocessors, microcontrollers, integrated circuits, programmable gate arrays, or other hardware components usable to execute instructions.

FIG. 3B is a side cross-sectional view 300B (i.e., a view of the side that abuts a face of a user) of an inflatable bladder 302 in accordance with some examples. In some examples, a portion of the inflatable bladder 302 may overlap a portion of the interface mounting structure 304. In some examples, inflatable bladder 302 may be covered (in whole or in part) in a layer of foam, comfort material, and/or fabric, etc. In some examples, the interface mounting structure 304 may be coupled to the external frame 324 of a headset device. In some examples, the inflatable bladder may include a valve 316 disposed at least partially within the inflatable bladder 302.

Figure 4:
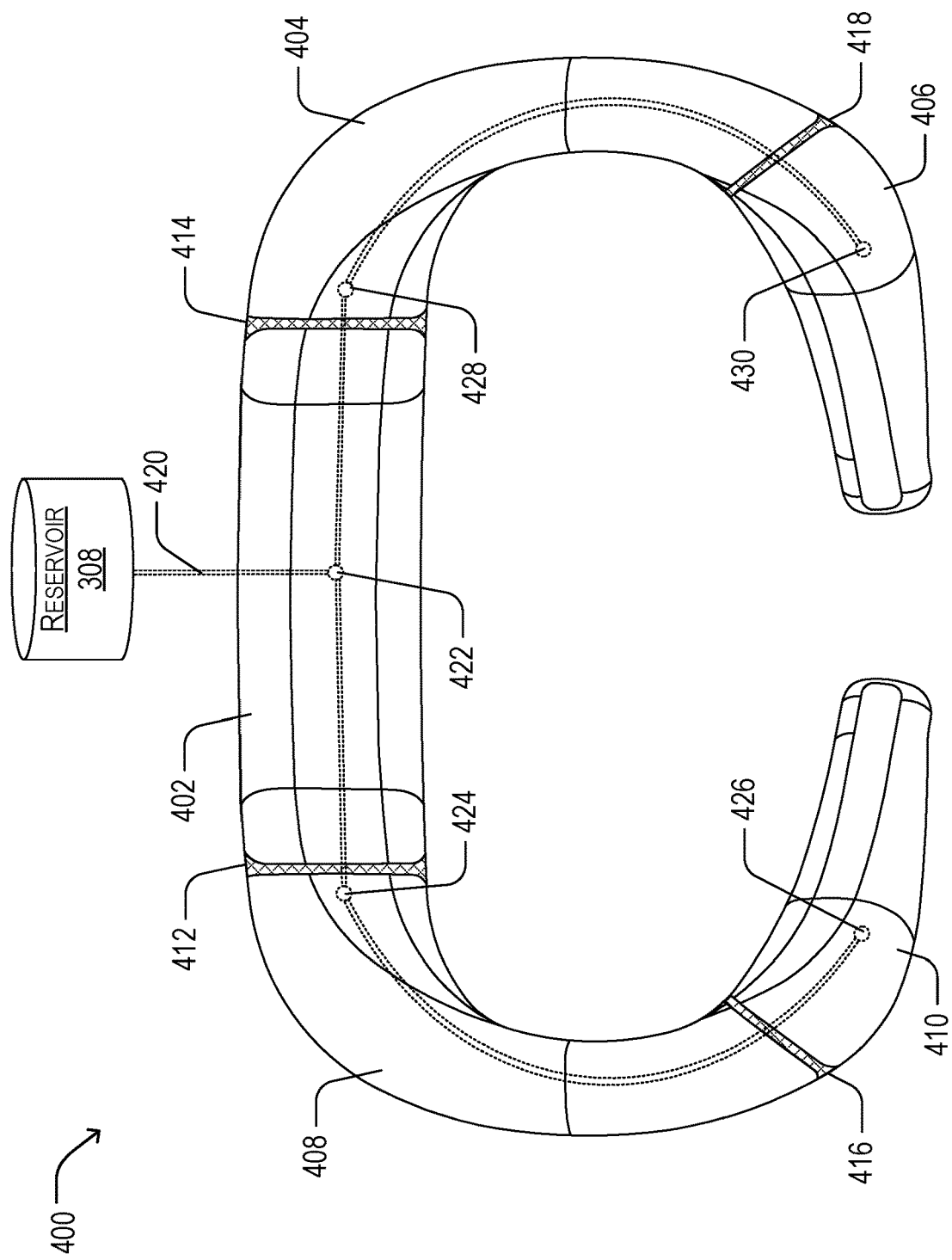
FIG. 4 is a front view of an example inflatable bladder partitioned into multiple bladder sections in accordance with an example of the present disclosure.

FIG. 4 is a front view (i.e., a view of the side that abuts a face of a user) of an example inflatable bladder 400 partitioned into multiple sections in accordance with some examples. Inflatable bladder 400 may comprise of any number of distinct bladder sections. For example, inflatable bladder 400 may be partitioned into three sections that include a first bladder section 402 positioned to abut a forehead of a user, a second bladder section configured to abut the right temple and right cheek of the user, and a third bladder section configured to abut the left temple and left cheek of the user. In some examples, inflatable bladder 400 may include a first bladder section 402 configured to abut the forehead of the user, a second bladder section 404 configured to abut at least a portion of the right temple of the user, a third bladder section 406 configured to abut at least a portion of the right cheek of the user, a fourth bladder section 408 configured to abut at least a portion of the left temple of the user, and a fifth bladder section 410 configured to abut at least a portion of the left cheek of the user.

In some examples, the inflatable bladder sections may be substantially separate from one another so that individual bladder sections can be inflated to a different pressure. For example, the bladder sections may be separated by a partition wall (e.g., partition walls 412, 414, 416, and 418). In some examples, the inflatable bladder 400 may be in fluid communication with a reservoir 308 as described in relation to FIG. 3A. In some examples, the reservoir 308 may be in fluid communication with the inflatable bladder 400 via flexible tubing 420. The flexible tubing 420 may be coupled to valves 422, 424, 426, 428, and 430. In some examples, the valves 422, 424, 426, 428, and 430 may be bidirectional valves. In some examples, individual bladder sections of the inflatable bladder are associated with a pressure sensor configured to measure a pressure within the individual bladder section.

Figure 5:
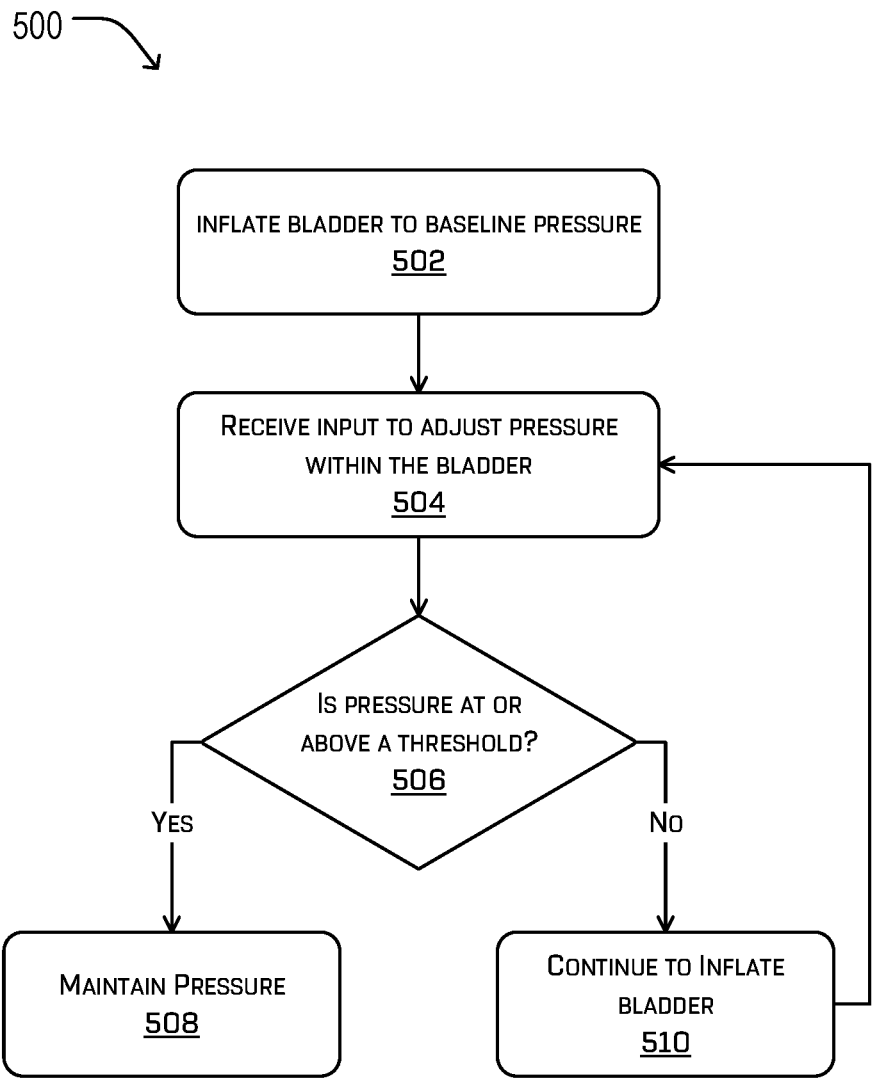
FIG. 5 is a flow diagram of an example method for adjusting a pressure within an inflatable bladder in accordance with an example of the present disclosure.

FIG. 5 is a flow diagram of an example method 500 for adjusting a pressure within an inflatable bladder in accordance with some examples.

At step 502, the method may include inflating an inflatable bladder associated with a head-mounted device with a fluid (e.g., such as any of the fluids discussed above) to a baseline pressure (e.g., during manufacturing). In some examples, the inflatable bladder is formed by a blow molding process or other heat forming technology. In some examples, the inflatable bladder may be sealed after it is pressurized.

At step 504, the method may include receiving input to adjust the pressure or volume of fluid within the inflatable bladder. For example, when a user initially puts the headset on and adjusts the strap(s) or headset, the inflation/deflation system may automatically adjust a pressure within one or more sections of the inflatable bladder to accommodate the facial features of the user. In some examples, a user may activate a pump (e.g., by pushing or pressing on pump 214) associated with the extended reality headset. In some examples, a user may use a controller associated with the headset to adjust a pressure within one or more sections of the inflatable bladder. In some examples, the inflation/deflation system may adjust the pressure within one or more sections of the inflatable bladder from a first pressure to a second pressure based on determining that a period of time has passed (e.g., based on how long a user has been wearing a headset). In some examples, the inflation/deflation system of the headset may receive input to adjust the pressure within the inflatable bladder based in part on a type of environment or action associated with an extended reality experience in order to simulate a particular environment or action as described above (e.g., the inflation/deflation system may increase and/or decrease the pressure within one or more bladder sections to simulate a user diving under water, falling, experiencing a touch, etc.).

At step 506, the method may include determining whether the pressure within the inflatable bladder is at or above a threshold. In some examples, the inflatable bladder may include one or more pressure sensors that measure a pressure within the inflatable bladder.

At step 508, in examples where the pressure within the inflatable bladder is at or above a threshold, the pressure within the inflatable bladder may be maintained. For example, a valve associated with the inflation/deflation system may be deactivated so that a volume of fluid within the inflatable bladder may be maintained.

At step 510, in examples where the pressure within the inflatable bladder is not at or above a threshold, the method may include continuing to inflate the inflatable bladder. For example, a pressure sensor within the inflatable bladder may be used to measure the pressure within one or more sections of the inflatable bladder. If the pressure level is not at or above the threshold pressure, an inflator associated with the inflation/deflation system may increase the pressure within the inflatable bladder in part by increasing the volume of fluid within the inflatable bladder. In some examples, the method can return to step 504 to receive input to adjust a pressure within the bladder. For example, a user may manually push or press a pump associated with an inflation/deflation system.

CONCLUSION

Although the discussion above sets forth example implementations of the described techniques and structural features, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims. For example, the structural features and/or methodological acts may be rearranged and/or combined with each other and/or other structural features and/or methodological acts. In various examples, one or more of the structural features and/or methodological acts may be omitted.

What is claimed is:

1. A headset device, comprising:
a housing;
an inflatable bladder coupled to the housing and configured to conform to facial contours of a face of a user when the headset device is worn by the user, wherein the inflatable bladder is filled with a fluid comprising air;
a vent associated with the inflatable bladder, the vent configured to emit the air onto the face of the user in order to simulate a breeze associated with an extended reality experience; and
an inflator in fluid communication with the inflatable bladder and configured to, upon activation, adjust a pressure within the inflatable bladder from a first pressure to a second pressure.

2. The headset device of claim 1, wherein the inflatable bladder comprises:
a first inflatable bladder section configured to abut a forehead of the user;
a second inflatable bladder section configured to abut a right temple and right cheek of the user; and
a third inflatable bladder section configured to abut a left temple and left cheek of the user,
wherein the inflator is in fluid communication with the first inflatable bladder section, the second inflatable bladder section, and the third inflatable bladder section.

3. The headset device of claim 1, wherein the inflatable bladder comprises:
a first inflatable bladder section configured to abut a forehead of the user;
a second inflatable bladder section configured to abut a right temple of the user;
a third inflatable bladder section configured to abut a right cheek of the user;
a fourth inflatable bladder section configured to abut a left temple of the user; and
a fifth inflatable bladder section configured to abut a left cheek of the user,
wherein the inflator is in fluid communication with the first inflatable bladder section, the second inflatable bladder section, the third inflatable bladder section, the fourth inflatable bladder section, and the fifth inflatable bladder section.

4. The headset device of claim 1, wherein the inflatable bladder is further configured to be filled with one of gel, water, nitrogen, or argon.

5. The headset device of claim 1, wherein the inflatable bladder is at least partially covered by a layer of foam and/or fabric.

6. The headset device of claim 1, wherein a first side of the inflatable bladder is configured to conform to the facial contours of the face of the user and a second side opposite the first side extends at least partially around a portion of the housing.

7. The headset device of claim 1, further comprising a pressure sensor coupled to the inflatable bladder and configured to measure a pressure within the inflatable bladder.

8. The headset device of claim 1, further comprising: a reservoir adapted to hold the fluid; and a valve coupled to the reservoir and the inflatable bladder, the valve configured to, upon activation, release the fluid from the reservoir and into the inflatable bladder in order to adjust the pressure within the inflatable bladder.

9. The headset device of claim 1, wherein the inflatable bladder is a first inflatable bladder positioned on a first side of the headset device, the headset device further comprising:

a second inflatable bladder positioned on a second side of the headset device opposite the first side and configured to conform to a back of a head of the user when the headset device is worn.

10. A method, comprising:

providing a housing of a head-mounted device;

providing an inflatable bladder coupled to the housing, the inflatable bladder configured to conform to a face of a user when the head-mounted device is worn;

filling, via an inflator in fluid communication with the inflatable bladder, the inflatable bladder with a fluid to a first pressure, wherein the fluid comprises air;

receiving input to adjust a pressure within the inflatable bladder;

providing a vent associated with the inflatable bladder, the vent configured to emit the air onto the face of the user in order to simulate a breeze associated with an extended reality experience; and activating the inflator to adjust the pressure within the inflatable bladder from the first pressure to a second pressure.

11. The method of claim 10, wherein the inflatable bladder comprises:

a first bladder section configured to abut a forehead of the user;

a second bladder section configured to abut a right temple and a right cheek of the user; and a third bladder section configured to abut a left temple and a left cheek of the user, wherein the inflator is in fluid communication with the first bladder section, second bladder section, and third bladder section.

12. The method of claim 10, wherein receiving the input to adjust the pressure within the inflatable bladder is based in part on determining that a length of a strap associated with the housing of the head-mounted device has been adjusted from a first length to a second length.

13. The method of claim 10, further comprising:

determining that a period of time has passed; and activating, based at least in part on determining that the period of time has passed, the inflator to adjust the pressure within the inflatable bladder from the second pressure to a third pressure.

14. The method of claim 10, wherein receiving the input to adjust the pressure within the inflatable bladder is based in part on a type of environment or action associated with an extended reality experience displayed via the head-mounted device.

15. An extended reality device comprising: a housing; a bladder coupled to the housing and configured to conform to facial contours of a face of a user when the extended reality device is worn by the user, wherein the bladder is filled with a fluid comprising air;

providing a vent associated with the bladder, the vent configured to emit the air onto the face of the user in order to simulate a breeze associated with an extended reality experience; and a pump in fluid communication with the bladder and configured to, upon activation, adjust a pressure within the bladder from a first pressure to a second pressure.

16. The extended reality device of claim 15, wherein the bladder is formed from an inextensible woven structure configured to limit an expansion of the bladder when the pressure within the bladder is adjusted from the first pressure to the second pressure.

17. The extended reality device of claim 15, wherein the pump is disposed on the housing.

18. The extended reality device of claim 15, further comprising:

a pressure sensor coupled to the bladder and configured to measure a pressure within the bladder.

* * * * *